Feb. 17, 1925.
J. A. STREUN
1,526,394
COTTON FEEDER CLEANER
Filed June 2, 1924
2 Sheets-Sheet 1
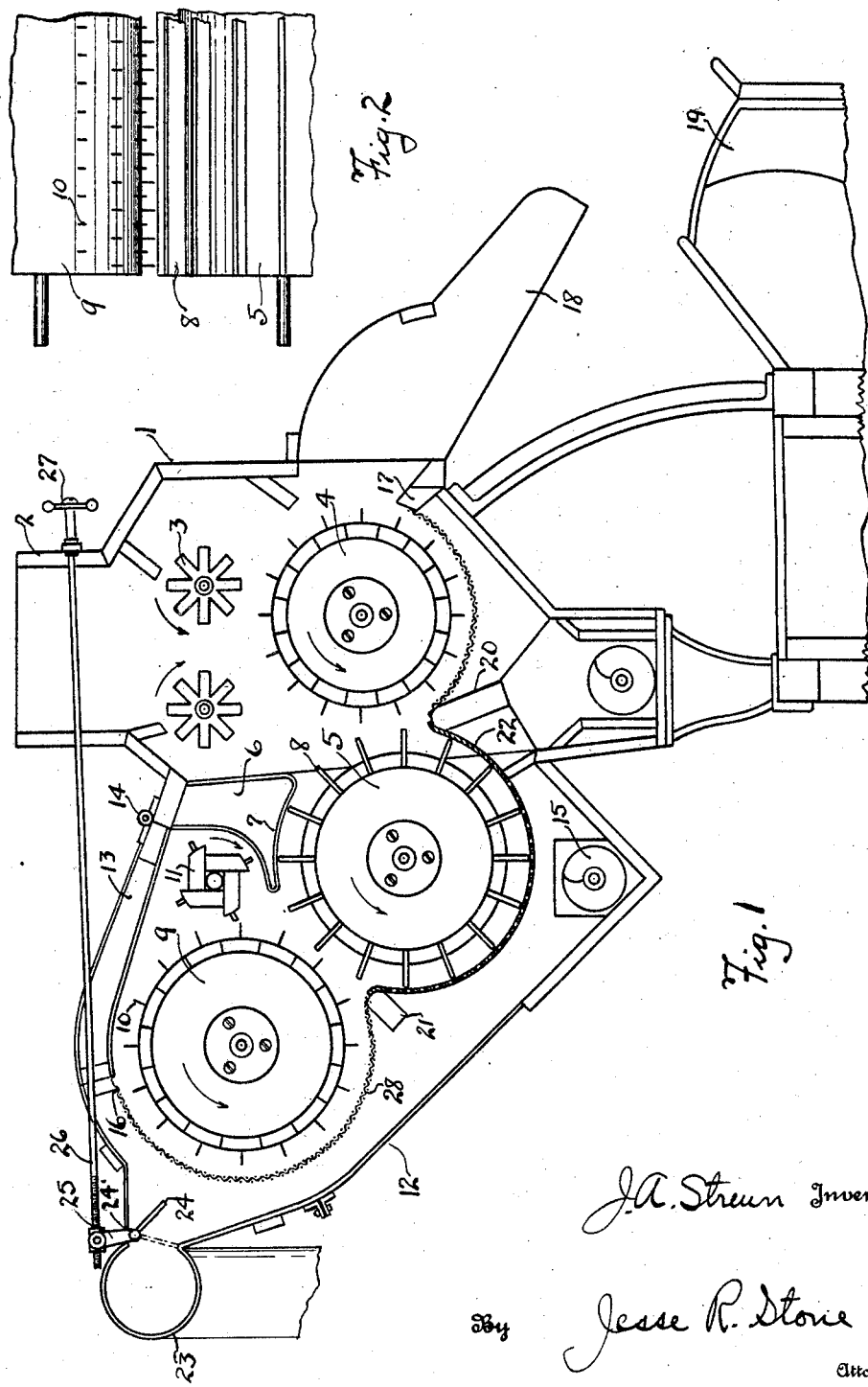

Feb. 17, 1925.　　　　　　　　　　　　　　　　1,526,394
J. A. STREUN
COTTON FEEDER CLEANER
Filed June 2, 1924　　　　　2 Sheets-Sheet 2
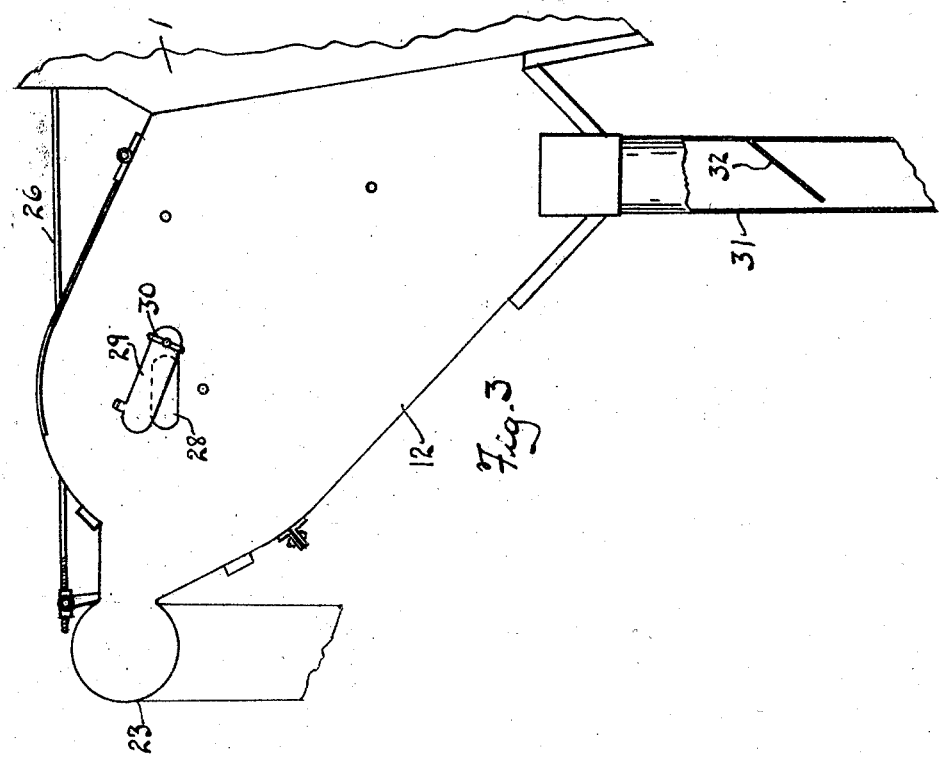
J. A. Streun, Inventor
By Jesse R. Stone
his Attorney Patented Feb. 17, 1925.

1,526,394

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

COTTON-FEEDER CLEANER.

Application filed June 2, 1924. Serial No. 717,229.

*To all whom it may concern:*

Be it known that I, JOHN A. STREUN, a citizen of the United States, residing at Sherman, Texas, have invented a certain new and useful Improvement in Cotton-Feeder Cleaners, of which the following is a specification.

My invention relates to feeders for cotton gins and pertains particularly to that class of feeders constructed to clean the seed cotton before it is fed to the gin, thereby increasing its quality and commercial value.

The cotton at some seasons of the year is filled with hulls, chaff and dirt which should be eliminated before it is fed to the gin in order that the gin can handle the cotton properly in separating the seed from the lint. It is the purpose of the invention to provide a feeder which will break up the lumps of cotton and allow the separation therefrom of the dirt and chaff.

It is another object to provide an efficient cleaning attachment which will eliminate the dust, dirt, and lighter impurities from the lint in its passage through the machine.

It is also desired to evenly distribute and spread out the seed cotton so that it may be fed to the gin in a smooth uniform stream.

Referring to the drawing herewith Fig. 1 shows a side elevation of my feeder cleaner with one side of the housing removed to disclose the inner working parts. Fig. 2 is a broken detail inside elevation of the two cleaner cylinders. Fig. 3 is a side elevation of the housing for the said cleaner cylinders. Like numerals of reference are applied to like parts in all the views.

The device disclosed in the drawings is an improvement on the invention shown in my prior Patent No. 1,473,059 granted Nov. 6, 1923, and differs therefrom in its arrangement of the cleaning apparatus.

There is a housing 1 in which is formed a forward hopper 2 into which the cotton may be fed. Said cotton may be received upon the feeding rolls 3, 3 by means of which it is compressed and delivered downwardly in an even compact bat. A picker cylinder 4 below said feeder rolls is mounted in the housing for rotation in a counterclockwise direction, as seen in Fig. 1, to break off wads or lumps of cotton from said bat and throw it rearwardly upon a valve cylinder 5 mounted slightly below said picker cylinder and rotatable in bearings in the walls of the housing, also in a counterclockwise direction.

Above the cylinder 5 there is a downwardly extending wall or baffle 6 separating the rear portion of the housing from the feeder rolls. Said wall has its lower end extended laterally and curved on an arc corresponding with the outer circumference of the fan cylinder 5, as shown at 7. The cylinder 5 has thereon parallel longitudinal flights or blades 8 extending radially therefrom to fit against the wall 6 as shown.

To the rear of cylinder 5 is a picker cleaning cylinder 9, mounted for rotation in a clockwise direction above and to the rear of cylinder 5. It has radial pins or teeth 10 thereon to engage the cotton.

Between the cylinders 5 and 9 and above the cylinder 5 is an agitator roll 11 rotatable in a clockwise direction, but at a slower peripheral speed than said cylinders. The wall 6 has its rear face curved and spaced slightly from the said agitator roll.

The rear portion 12 of the housing is shaped to surround the rolls and cylinders somewhat closely. It has an upper door 13, hinged at 14, and a conveyer 15 of the screw type is shown in the lower end of the housing where it serves to move dirt and chaff from the housing.

Beginning at a point 16 adjacent the door 13 is a foraminated screen 28 of woven wire or other equivalent construction. It is spaced slightly from the outer ends of the cylinder teeth and is curved to conform to the shape of the cylinders. It is supported at its forward end upon a cross bar 17 at the upper end of the chute 18 leading to the gin 19. Intermediate supports 20 and 21 are provided between adjacent cylinders. The screen below the cylinder 5 is preferably of perforated sheet metal in order that there may be a forward imperforate section or strip 22 adjacent the bar 20, thus forming a passage between the wall 7 and the strip 22 which is completely filled by the cylinder 5. To accomplish this the screen has contact with the lower edges of the blades 8 of the cylinder.

A suction device is connected with the upper side of the housing 12 at the rear end thereof. Said device is shown somewhat diagrammatically at 23. A valve or damper 24 is hinged at 24' on the casing to partially or wholly close the passage to the suction pipe 23 as desired. This valve is operated by a lever 25 adjustable through a rod 26 having an operating handle 27 thereon at the forward side of the housing 1.

In order to control the circulation of air properly through the cotton in its passage through the housing, I provide openings 28 in the sides of the housing above the axis of the rear cylinder 9. A cover 29 pivoted on a bolt having a thumb nut 30 thereon may be adjusted to limit the size of the opening as required.

A canvas outlet chute 31 is provided on the opening adjacent the conveyor 15 to discharge the dirt. It has therein a canvas flap valve 32 held normally closed by the suction from the housing. The weight of the dirt upon the valve will, however, cause it to discharge its load when the dirt has accumulated thereon sufficiently. In this way no dirt is drawn back into the cotton.

In the operation of my device the cotton torn off from the bat passing the rolls 3 by the teeth of the cylinder 4 is received upon the flights of the cylinder 5 and carried into the rear chamber and thrown upon the cylinder 9. As it is carried up over the cylinder 9 it is broken up and more evenly distributed by the agitator roll 11, which, as stated, has a slower speed than the cylinders. The cotton then is carried around underneath the cylinders, over the screen 28 to be finally delivered to the feeding chute 18. While passing around the cylinder 9 the cotton will be in loosened condition, broken and fluffed up so that the dirt may be eliminated. It is there subjected to a strong suction of air through the sides of the housing and around the cylinder 9 to carry off the lighter particles of dust and chaff through the pipe 23. The heavier particles will be rubbed through the screen 28 and will settle down to the lower end of the casing where the conveyers will carry it from the machine.

It will be noted that no air is drawn from the feeder portion of the device and none of the dirt from the conveyer 15 can be sucked up into the cotton. Only clean air is passed through the cotton and a much more efficient cleaning of the cotton may be accomplished. The cotton is not only fed to the gin in a uniform even flow, but it will be cleaned of a large part of the dirt and chaff so that the gin may function more effectively with a resulting ginned cotton of greater commercial value. The advantages of this construction will be appreciated by those skilled in the art.

What I claim as new, and desire to protect by Letters Patent is:

1. In a cotton feeder cleaner the combination with feeding rolls and a picker cylinder mounted for rotation in a housing of a valve cylinder with longitudinal flights thereon acting to move the cotton rearwardly from the picker cylinder, walls in said housing fitting against said flights above and below the same, a cleaning cylinder, an agitating roll, a screen partially surrounding said cylinders, and suction means at the rear of said housing, there being air inlets to said housing adjacent said cleaning cylinder.

2. In a feeder cleaner for cotton gins, a housing having a forward feeding chamber and a rearward cleaning chamber, a rotating cylinder between said chambers, means closing the space above and below said cylinder, a cleaning cylinder adjacent the first said cylinder, agitating means between said cylinders, a screen partially surrounding said cylinders, and suction means on said housing adapted to cause a circulation of air through the sides of said housing around said cleaning cylinder to said suction means.

3. In a cotton feeder cleaner for cotton gins, a housing, forward and rearward chambers therein, a valve cylinder rotatable between said chambers and adapted to fill the passage between them, longitudinal flights on said cylinder to receive the cotton and move it rearwardly, a cleaning cylinder above and to the rear of said valve cylinder, an agitator roll between said cylinders, and suction means to draw air through the cotton as it passes around said cleaning cylinder.

4. In a cleaner feeder for cotton gins, the combination with a feeder device, of a cleaning chamber adjacent thereto, means to prevent appreciable circulation of air between said feeder and said chamber, a cleaning cylinder and agitating roller in said chamber, the walls of said chamber having adjustable openings therein; and a suction means connected with said chamber to circulate air through the cotton in said chamber for the purpose described.

5. In a cleaner feeder for cotton gins, a housing, a forward and a rear chamber therein, feeding rolls and a picker cylinder in the forward chamber, a valve cylinder controlling the passage between said chambers, a cleaning cylinder and agitating roll in the rear chamber, and means connected with the rear chamber to draw air through the walls of said chamber and over said cleaning cylinder for the purpose described.

6. In a feeder cleaner for cotton gins, a cleaning chamber, a cleaning cylinder therein, openings in the walls of said chamber, an agitator roll adjacent to said cylinder, means to convey said cotton to said chamber but preventing the rapid circulation of air thereto, a suction member on said chamber, and a screen partially enclosing said cylinder and roll.

In testimony whereof I hereunto affix my signature May, A. D. 1924.

JOHN ARNOLD STREUN.